United States Patent [19]
Barbin et al.

[11] 3,941,740
[45] Mar. 2, 1976

[54] METHOD OF DISPERSING CARBON BLACK IN LIQUID ELASTOMERS

[75] Inventors: William W. Barbin, Massillon, Ohio; Joseph C. Sanda, Jr., Youngstown, N.Y.

[73] Assignee: The Firestone Tire & Rubber Company, Akron, Ohio

[22] Filed: Feb. 20, 1974

[21] Appl. No.: 444,081

[52] U.S. Cl. ......... 260/33.6 AQ; 106/285; 106/307; 260/94.7 A; 260/94.7 N
[51] Int. Cl.² ................... C08K 5/01; C08K 3/04
[58] Field of Search ....... 106/285, 307; 260/94.7 A, 260/33.6 AQ, 94.7 N

[56] References Cited
UNITED STATES PATENTS

| 3,338,729 | 8/1967 | Ruoho | 106/307 |
| 3,340,080 | 9/1967 | Henderson | 106/307 |
| 3,427,366 | 2/1969 | Verdol et al. | 260/94.7 A |
| 3,595,851 | 7/1971 | Boutsicaris et al. | 260/94.7 A |

*Primary Examiner*—Donald E. Czaja
*Assistant Examiner*—H. H. Fletcher

[57] ABSTRACT

A low shear method of adequately dispersing carbon black in liquid elastomers by adding the liquid elastomers to a container, adding from 30 parts to about 160 parts by weight per 100 parts of liquid elastomer of an oil beaded carbon black containing from 5 to about 60 parts of oil and from 25 to about 100 parts of carbon black and mixing the compounds to produce a relatively low viscosity carbon black dispersed elastomeric composition.

39 Claims, No Drawings

3,941,740

METHOD OF DISPERSING CARBON BLACK IN LIQUID ELASTOMERS

BACKGROUND OF THE INVENTION

The present invention relates to a method of dispersing carbon black in liquid elastomers. More specifically, the present invention relates to a low shear method for adequately dispersing carbon black in liquid elastomers.

Cured or vulcanized elastomers invariably must be compounded with reinforcing fillers to improve properties such as tensile strength, stiffness, abrasion resistance and tear resistance in order to permit their use for items such as tire tread, tire carcass as well as for hoses, belts and other mechanical goods. One outstanding reinforcing filler for both natural and synthetic elastomers is carbon black.

Heretofore in the field of liquid elastomers, that is, elastomers which are liquids at ambient or slightly above ambient temperatures, carbon black (which has been beaded or pelletized either by blending with water to form water beaded blacks or with glycerin to form glycerin beaded carbon blacks) was incorporated by adding the carbon black to the liquid elastomer and dispersed by the use of very high shear equipment or mixers such as the three roll paint mill. In the mixing of conventional rubbers, shear is generated partially by the rubber or polymer itself whereas in liquid elastomers, such internal shear generating properties are not present and thus carbon black cannot be adequately dispersed by using high shear mixers such as the Banbury, Brabender or the like. High shear equipment such as the three roll paint mill must be used. However, this high shear equipment is expensive, consumes great amounts of power or energy and requires long periods of time to adequately incorporate or disperse the carbon black. Moreover, heat build-up is often a problem and would sometimes scorch or degrade the elastomer. This high shear three roll paint mill is also not readily scaled-up to production capacity.

In the production of conventional rubbers, the vulcanization route briefly involves cutting rubber stock, mixing the cut rubber stock as in a Banbury Mixer, heating the stock via warm-up rolls, either extruding, injecting molding or pressing the stock and then vulcanizing the stock. These many steps, of course, require a high amount of capital as well as several pieces of expensive equipment. On the other hand, the liquid elastomers of this invention, after having been adequately dispersed with oil, carbon black and other compounding ingredients, are still relatively low in viscosity and can be processed and cured in equipment requiring much less energy and capital costs than conventional rubber processing equipment.

A search of the United States Patent Office has not revealed any patents which incorporate carbon black into liquid elastomers by a method similar to or suggestive of the present invention.

SUMMARY OF THE INVENTION

It is, therefore, an object of the present invention to provide a method of readily, easily and adequately dispersing carbon black into a liquid elastomer.

It is another object of the present invention to provide a method of dispersing carbon black into a liquid elastomer, as above, which utilizes oil beaded carbon black.

It is still another object of the present invention to provide a method of dispersing carbon black into a liquid elastomer, as above, which utilizes inexpensive and low shear mixing equipment.

It is a further object of the present invention to provide a method of dispersing carbon black into a liquid elastomer, as above, wherein no heat build-up or scorch problems occur, even with the use of catalysts.

It is a still further object of the present invention to provide a method of dispersing carbon black into a liquid elastomer, as above, and to readily cure such liquid elastomer formulation to produce a final product.

These and other objects of the present invention are described in detail without attempting to discuss all of the various modifications in which the invention may be embodied; the invention being measured by the appended claims and not by the details of the specification.

In general, a method of dispersing carbon black in a liquid elastomer comprises adding the liquid elastomer to a container, adding from 30 parts to about 160 parts by weight of oil beaded carbon black to the container for every 100 parts of liquid elastomer, the oil beaded carbon black containing from 5 to about 60 parts by weight of oil and from 25 to about 100 parts by weight of carbon black and mixing to produce an elastomeric composition containing carbon black adequately dispersed therein which has a relatively low viscosity.

DESCRIPTION OF THE PREFERRED EMBODIMENTS

Liquid elastomers which can be used in the present invention include any elastomers which are liquid at ambient or slightly above ambient temperatures. Such liquid elastomers usually have short chains or low molecular weights and therefore generally take a long period of the time to cure or vulcanize when sulfur curative systems are utilized. Since it is highly desirable to reduce such lengthy cure times, preferably crosslinking or chain extending systems which react quickly to cure elastomers are utilized in the present invention. In order for the liquid elastomers to be curable, they must contain two or more terminally reactive groups. Terminal hydroxyl groups constitute a preferred class of terminally reactive groups. Other terminally reactive groups include mercaptan and carboxylic acid groups. In general, liquid elastomers which contain reactive end groups preferred for the present invention include polybutadienes, poly(butadiene/styrene) copolymers, polyisoprenes, and polychloroprenes all of which contain two or more terminal hydroxyl, mercapto or carboxyl groups, polyoxypropylene glycols, polyoxytetramethylene glycols and the nitrile elastomers (copolymers of butadiene and acrylonitrile which have terminal hydroxyl, mercapto or carboxyl groups). Such terminated elastomers are produced according to conventional processes and techniques well known to those skilled in the art. Representative examples of liquid elastomers which contain terminally active groups and are commercially produced include the following:

| | | |
|---|---|---|
| Poly bd R45 HT | Hydroxy terminated polybutadiene | Atlantic Richfield Co. |
| Poly bd R45M | " " | " |

| | | | |
|---|---|---|---|
| Poly Bd CS-15 | " | butadiene/styrene copolymer | " |
| Poly bd CN-15 | " | butadiene/acrylonitrile copolymer | " |
| Butarez HTS | " | polybutadiene | Phillips Petroleum Co. |
| Butarez CTL 11 | Carboxyl terminated | polybutadiene | " |
| Hycar CTB | " | " | B.F. Goodrich Co. |
| HC434 | " | " | Thiokol Co. |
| Hycar CTBN | " | butadiene/acrylonitrile copolymer | B.F. Goodrich Co. |
| Neoprene PS | Hydroxy terminated | chloroprene | E.I. DuPont |

Other commercial liquid elastomers containing terminally reactive groups may, of course, also be used.

The carbon black which is incorporated into the liquid elastomer may generally be any type carbon black which is used for reinforcing elastomers. Furnace grade carbon blacks have been found to be particularly suited to the present invention and therefore are preferred. Generally, from 25 to about 100 parts by weight of carbon black for every 100 parts by weight of liquid elastomer is desirable. Although amounts of carbon black in excess of 100 parts may be used, such high levels usually resulted in compounds which were viscous and required much higher capacity shearing equipment to disperse carbon black than otherwise needed. A range of 40 to about 70 parts by weight of carbon black is generally favored. Representative grade types of carbon black include SAF, ISAF, 4AF, AND FF.

According to the present invention, it has unexpectedly been found that hydrocarbon oils when added to carbon black and mixed to form oil beaded carbon blacks greatly reduce the amount of shear or energy requirements necessary to disperse the carbon black in the liquid elastomers. Such results were completely unexpected since the oil has a much higher viscosity than water and glycerin which have heretofore been used. The hydrocarbon oil may be entirely added to the carbon black to form oil beaded carbon black before the addition to or mixing with the liquid elastomer or a part of the oil may be added to or mixed with the liquid elastomer before separately adding the oil beaded carbon black. In either situation, the unexpected and unusually low viscosity of the liquid elastomer/oil-beaded carbon black mixture makes it possible to use conventional rubber mixing equipment such as the Banbury, Brabender, or a two-roll mill to obtain adequate dispersion of the carbon black and liquid elastomer. In general, the three-roll paint mill which produces very high shear has been the only method for obtaining adequate dispersions of carbon black in liquid elastomers. The three roll-paint mill, however, has the disadvantage that it is not readily adaptable to large scale and consumes large amounts of energy. However, it has now been found that adequate dispersions can be obtained when one uses oil-beaded carbon blacks in the relatively low shear Baker-Perkins Mixer. This mixer consumes considerably less energy and is more applicable to large scale processing.

Although the hydrocarbon oil may be any conventional oil used in processing of rubber, aromatic oils are preferred. In general, from 5 parts to about 60 parts of oil by weight may be used for every 100 parts by weight of liquid elastomer. A more desirable range is from 15 to about 40 parts by weight. Thus, the amount of oil beaded carbon black will range from 30 to 160 parts by weight wherein the oil content will range from 5 to 60 parts.

Preferably, to produce low shear mixing requirements, a substantial amount of the oil is added via the oil beaded carbon black such that the amount of oil added separately to the liquid elastomer ranges from 0 to about 35 parts by weight so that the amount of oil contained in the oil beaded carbon black is now from 5 to 25 parts by weight. Hence, the amount of oil beaded carbon black will range from 5 to about 125 parts by weight wherein the oil content will range from 5 to about 25 parts. An example of an aromatic oil is Dutrex 916 produced by Shell. Examples of commercially available oil beaded carbon black types heretofore never used or suggested for use in the field of elastomers include ISAF carbon black produced by Columbia containing from 16 to 27% by weight of an aromatic oil, Raven 800 carbon black produced by Cabot Corporation and containing approximately 15% by weight of an aromatic oil and HAF carbon black produced by Cabot Corporation and containing approximately 5% by weight of an aromatic oil. The commercially available oil beaded carbon blacks generally contain low amounts of oil and hence additional oil often must be added and mixed before the oil beaded carbon black can be added to the liquid elastomers to produce the low viscosity mixtures of the present invention. An advantage of using blended oil beaded carbon black is that severe dust and pollution problems encountered with final carbon black mixing operations are eliminated. Such blending operations can readily be carried out in airtight mixing vessels.

Regardless of whether the oil is added totally as oil beaded carbon black or a part of the oil is added to the liquid separate from the oil beaded carbon black to a mixer containing the liquid elastomer and the carbon black, inexpensive low viscosity or shear mixers such as the Baker-Perkins Mixer may be utilized. The mixing of the compounds in such a mixer does not result in any significant build-up of heat or scorching since the low viscosity of the compounds does not require large amounts of energy.

An indication of the low amount of shear force and energy required to disperse the carbon black with the use of oil compounds as compared to the dispersement of carbon black directly in liquid elastomers is given by the mixing time of a low shear mixer to produce a 0/0 reading on the NPIRI grindometer scale. 1) Three materbatches were prepared and tested. Each of these masterbatches contained 100 parts by weight of Arco CS-15, a hydroxy terminated polybutadiene styrene liquid copolymer. The recipe of these masterbatches are set forth below in Table I as 1B, and 2B, and 3B. The carbon black ranged from 50 to 70 parts and the total amount of aromatic oil ranged from 15 to 40 parts. These masterbatches were premixed by hand to produce oil beaded carbon blacks and then dispersed in a Baker-Perkins Mixer. All masterbatches when sampled gave a 0/0 grindometer reading as follows: 1B, 10 minutes; 2B, 20 minutes; 3B, 20 minutes.

In contrast, similar masterbatches were prepared in the same proportions except that the carbon black used was not oil-beaded prior to the mixing. All of these three masterbatches gave a 250/250 grindometer reading after having been mixed for times in excess of 60 minutes.

In order to test the physical properties of liquid elastomers containing carbon blacks dispersed therein according to the present process and to impart favorable properties for practical applications, the liquid elastomer compositions must be cured.

1)(The conventional National Printers Ink Research Institute grindometer has a scale from 0/0 which represents the best dispersion to 250/250 which represents a very poor dispersion. On this scale, the first number represents the point where three scratches appear and the second number represents the point where ten scratches appear.) Any cure system for hydroxyl or carboxyl terminal groups may be used. Thus for hydroxyl groups, diisocyanate cure systems may be used whereas for carboxyl groups, aziridines and epoxy/amine cure systems may be used. Preferably, diisocyanates cure systems are desirable because of their short cure time. To insure a fairly complete reaction and a short cure time, a slight equivalent excess of diisocyanate to the active hydrogen terminated liquid elastomers is favored. However, since diisocyanates react readily with water, it is desirable that the liquid elastomer compositions be substantially free from water so that a large equivalent excess diisocyanate is not needed. This result can be obtained as by heating the entire liquid elastomer composition or subjecting it to a vacuum to drive off the water. The use of oil beaded carbon black blends further abates this problem since they have been found to be fairly dry and fluffy even though the oil content is as high as 50% and are less susceptible to absorbing and retaining atmospheric moisture after drying as compared to regular pelletized carbon black. When liquid elastomer compositions which are substantially free of water are utilized, the optimum ratio of isocyanate to the active hydrogens (NCO/OH) will range from 1.0 to about 1.7. Should the liquid elastomer compositions contain water, the optimum equivalent ratio may range up to about 3.0, depending, of course, upon the amount of water. An optimum equivalent isocyanate to hydroxy ratio can be readily determined by simple experimentation by hand mixing small batches with varying amounts of isocyanate and curing small test samples. The test samples will then show optimum properties at the optimum isocyanate level. This is illustrated in Table II. Recipes 4, 5, 6 and 7 are identical except that the NCO/OH ratio is varied from 1.00 to 1.60. In examining the normal stress-strain properties, it is evident that the optimum ratio (of those studied) is 1.60.

Diisocyanates or diisothiocyanates which can be used in the present invention are generally represented by the formula $R(N=C=X)_2$ where R can be an aliphatic type group containing from 2 to 20 carbon atoms, a cycloaliphatic type group containing from 4 to about 20 carbon atoms or an aromatic type group containing from 6 to about 20 carbon atoms and X is a chalcogen (oxygen or sulfur). Examples of diisocyanates include:
  1,5-Naphthylene diisocyanate
  Chlorophenyl 2,4-diisocyanate
  3,3'-dimethyl-4,4'-diphenyl diisocyanate
  3,3'-dimethyl-4,4'-diphenylmethane diisocyanate
  4,4'-diphenylisoproplylidine diisocyanate
  4,4'-Diphenylmethane diisocyanate
  4,4'-Dicyclohexylmethane diisocyanate
  Isophorone diisocyanate
  2,3,5,6-Tetramethyl-1,4-benzene diisocyanate
  2,4,4-Trimethyl-hexamethylene diisocyanate
Preferred diisocyanates include:
  2,4-Toluene diisocyanate
  1,4-Phenylene diisocyanate
  1,6-Hexamethylene diisocyanate
  Dianisidine diisocyanate
  Triisocyanates such as 4,4',4''-Triphenylmethane triisocyanate may also be used.

Of course, the diisothiocyanates which correspond to the above diisocyanates can also be used. It is to be understood that whenever reference is made in this specification to diisocyanate, it should be obvious to one skilled in the art that such reference also includes diisothiocyanates.

The curing procedure of the liquid elastomer compositions can be carried out according to well known methods of procedures. In order to increase the curing rate and decrease the cure time, usually conventional catalysts which can be classified as metallic esters (soaps) or amine catalysts can be utilized in small amounts of approximately 0.01 to 1.0 parts by weight per 100 parts of liquid elastomer. An example of such catalysts which are well known to those skilled in the art is dibutyltin dilaurate. Moreover, to retard oxidation during the curing step, and to retard oxidation in the finished article, conventional antioxidants well known to the elastomer art may be used. The phenolic types such as 2,6-dibutyl-p-cresol are preferred.

The liquid elastomers of the present invention may also be blended with reinforcing fillers or other materials other than carbon black to usually improve specific properties. For example, various amounts of polyether diols such as polytetrahydrofuran (OH terminated) (produced by the Quaker Oats Company as Polymeg 5202) or polyoxypropylene glycols may be substituted for part of the liquid elastomer to improve the strength of the cured liquid elastomer composition. Similarly, other reinforcing fillers such as silica may be used to impart desired properties to help tailor make elastomeric compositions for specific end uses.

The liquid elastomer compositions may generally be processed by adding to a low shear mixer or a mixer of average power requirements a terminally reactive liquid elastomer. The desired amount of oil beaded carbon black may then be added. Preferably, the carbon black and oil are blended together and dried as by heating or in a vacuum to remove the water and the blend then added to the mixer. These compounds are then mixed for a short period of time until the carbon black and oil has been dispersed adequately into the liquid elastomer. The mixed liquid elastomer composition may then be cured using a conventional diisocyanate compound. The optimum amount of diisocyanate curing compound will vary, of course, according to the amount of water in the mixed liquid elastomer composition. Moreover, catalysts which increase the cure rate and antioxidants which prevent oxidation may be added, as desired. Thus, the present method presents a very practical approach to the reinforcement of liquid elastomers with carbon black. Additionally, the level or amount of carbon black and oil may be varied over a fairly wide range.

The unique advantage of the present invention is that because of the low viscosity of the liquid elastomer composition, the particular elastomer may be cured in a mold to produce the final product or to produce an article such as a tire tread which may be applied to produce a final product. Elastomers so produced, of course, can be used as tire treads, and for numerous mechanical goods such as conveyor belts, rubber tubing, rubber hoses and the like. The necessity of several operations requiring expensive machinery as in the production of solid elastomers is thereby avoided.

Masterbatches of liquid elastomer compositions made according to the above steps were prepared in low shear mixers and physical tests conducted. Moreover, masterbatches made according to the same recipes were tested on a high shear paint mill to determine whether any significantly different physical properties were obtained by a high shear dispersement. The exact composition of the liquid elastomers and the physical test data results are set forth in Table I.

TABLE I

RECIPE AND PHYSICAL CURE DATA OF CARBON BLACK AND OIL DISPERSIONS IN LIQUID ELASTOMERS

| RECIPE NO. | 1A | 1B | 2A | 2B | 3A | 3B |
|---|---|---|---|---|---|---|
| Dispersing Mixer | Paint Mill | Baker-Perkins | P.M. | B-P | P.M. | B-P |
| ARCO CS-15 | 100 | 100 | 100 | 100 | 75 | 75 |
| (Bd/St-OH term't) | — | — | — | — | 25 | 25 |
| Polymeg 5202 | | | | | | |
| Type and Amt. of | ISAF | ISAF | ISAF | ISAF | HAF | HAF |
| Carbon Black/ | 70/13.6 | 70/13.6 | 50/18.6 | 50/18.6 | 50/2.63 | 50/2.63 |
| Aromatic Oil | | | | | | |
| Shell | 26.4 | 26.4 | 1.4 | 1.4 | 12.37 | 12.37 |
| Durex 916 oil, | | | | | | |
| Isonate 143-L | | | | | | |
| (MDI) | 12.80 | 12.80 | 14.63 | 14.63 | — | — |
| Hylene-T (TDI) | — | — | — | — | 12.22 | 12.22 |
| NCO/OH Ratio | 1.40 | 1.40 | 1.60 | 1.60 | 2.50 | 2.50 |
| (optimum) | | | | | | |
| Ethyl 702 Antioxidant | 1.0 | 1.0 | 1.0 | 1.0 | 1.0 | 1.0 |
| DBTDL | — | — | — | — | 0.05 | 0.05 |
| Cure Cycles | | | | | | |
| Tensile Slabs | | 35'/300°F | | 25'/300°F | | 20'/300°F |
| Compression Set | | 35'/300°F | | 33'/300°F | | 20'/300°F |
| Buttons | | | | | | |
| Stanley-London Blocks | | 35'/300°F | | 33'/300°F | | 20'/300°F |
| Flexometer Blocks | | 50'/300°F | | 38'/300°F | | 30'/300°F |
| Normal Stress-Strain Properties | | | | | | |
| 100% Modulus, psi | 525 | 675 | 400 | 425 | 625 | 650 |
| 300% Modulus, psi | 1525 | 1775 | 1275 | 1300 | — | 1700 |
| Tensile Strength, psi | 2000 | 1850 | 1400 | 1575 | 1725 | 1750 |
| Ultimate Elong., % | 380 | 310 | 320 | 350 | 280 | 310 |
| Aged Stress-Strain Properties - 4 days at 212°F | | | | | | |
| 100% Modulus, psi | 750 | — | 500 | 500 | 875 | 850 |
| 200% Modulus, psi | 1675 | — | 1100 | 1150 | — | — |
| 300% Modulus, psi | — | — | — | — | — | — |
| Tensile Strength, psi | 2200 | — | 1875 | 1700 | 1600 | 1350 |
| Retention, % | 110 | — | 134 | 108 | 92.8 | 77.1 |
| Ultimate Elong., % | 250 | — | 300 | 270 | 190 | 160 |
| Retention, % | 66 | — | 94 | 77 | 67.9 | 51.6 |
| Hot Ring Tear | | | | | | |
| Lbs./in.: | | | | | | |
| at 212°F | 207 | 214 | 54 | 64 | 154 | 163 |
| at 275°F | — | — | — | 48 | — | — |
| Shore "A" Hardness at 73°F (on Compression Set Button) | | | | | | |
| | 76 | 77 | 69 | 69 | 75 | 77 |
| Compression Set - 22 Hrs./158°F (on Compression Set Button) | | | | | | |
| % | 70 | 58 | 53 | 49 | 40 | 38.4 |
| Dispersion Rating* (on Compression Set Button) | | | | | | |
| | 2 | 1 | 1 | 1 | 1 | 1 |

*The dispersion rating scale ranges from one through seven, with a rating of one giving the best dispersion and seven being the poorest dispersion. The dispersion rating is determined as follows: A compression set button of the cured composition under test is cut through with a guillotine and the cut surface compared visually with a series of 7 standard cut blocks, and the number of the most nearly similar standard button assigned as the dispersion rating of the composition under test. The test is essentially that of ASTM D-2663-69 Method A visual inspection except that 7 standards are used instead of 5 as in the ASTM test.

COMPOUND IDENTIFICATION

| ARCO CS-15 | Butadiene/Styrene (75/25) hydroxy terminated copolymer - ARCO Chemical |
| Polymeg 5202 | Polytetrahydrofuran, hydroxy terminated M.W. 5200 - Quaker Oats |
| Dutrex 916 Oil | Highly aromatic Processing Oil - Shell Oil Co. |
| Isonate 143L | 4,4'-Diphenylmethane diisocyanate - Upjohn |
| Hylene T | Toluene 2,4-diisocyanate - DuPont |
| Ethyl 702 | 4,4'-Methylene-bis-2,6-di-t-butyl phenol - Ethyl Corp. |
| DBTDL | Dibutyltin dilaurate - Ventron Chem. |

"P.M. designates Three Roll Paint Mill B.P. designates Baker-Perkins Mixer

In general, ISAF grade carbon black loaded liquid elastomers were better than those with HAF carbon black at the optimum NCO/OH ratio. In comparison to the high shear paint mill carbon black dispersion, the low shear Baker-Perkins stocks showed equal to better dispersion ratings and slightly lower compression set.

Further masterbatches of liquid elastomer compositions were made in a manner as set forth above in low shear mixers and physical tests conducted. The results are set forth in Table II.

TABLE II

RECIPE AND PHYSICAL CURE DATA OF OIL BEADED CARBON BLACK DISPERSIONS IN LIQUID ELASTOMERS

| RECIPE NO. | 4 | 5 | 6 | 7 | 8 | 9 | 10 | 11 | 12 | 13 | 14 |
|---|---|---|---|---|---|---|---|---|---|---|---|
| Dispersion | | Baker-Perkins | | | | Baker-Perkins | | | Baker-Perkins | | |
| ARCO CS-15 (Bd/St-OH term't) | 100 | 100 | 100 | 100 | 100 | 100 | 100 | 100 | 100 | 100 | 100 |
| Type and Amt. of Carbon Black/Aromatic Oil | ISAF 50/9.74 | → | → | → | ISAF 50/9.74 (not dried) | → | → | ← | ISAF 50/18.59 (not dried) | → | → |
| Shell Dutrex 916 oil | 10.26 | 10.26 | 10.26 | 10.26 | 5.26 | 5.26 | 5.26 | 1.41 | 1.41 | 1.41 | 1.41 |
| Isonate 143-L (MDI) | 9.15 | 10.98 | 12.81 | 14.64 | 10.98 | 12.81 | 14.64 | 9.15 | 10.98 | 12.81 | 14.64 |
| NCO/OH Ratio (optimum) | 1.00 | 1.20 | 1.40 | 1.60 | 1.20 | 1.40 | 1.60 | 1.00 | 1.20 | 1.40 | 1.60 |
| Ethyl 702 Antioxidant | 1.00 | 1.00 | 1.00 | 1.00 | 1.00 | 1.00 | 1.00 | 1.00 | 1.00 | 1.00 | 1.00 |
| DBTDL Dibutyltin Dilaurate | 0.05 | 0.05 | 0.05 | 0.05 | 0.05 | 0.05 | 0.05 | 0.05 | 0.05 | 0.05 | 0.05 |
| Normal Stress-Strain Properties - Cured 35' at 300°F | | | | | | | | | | | |
| 100% Modulus, psi | 400 | 525 | 550 | 790 | 900 | 525 | 850 | 210 | 360 | 550 | 575 |
| 200% Modulus, psi | 750 | 1250 | 1200 | 1525 | 1525 | 1125 | 1600 | 565 | 825 | 925 | 1175 |
| 300% Modulus, psi | 1225 | 1675 | 1725 | 2150 | — | — | — | 1040 | — | 1335 | 1735 |
| Tensile Strength, psi | 1550 | 2170 | 2000 | 2500 | 1800 | 1475 | 1950 | 1210 | 1075 | 1400 | 1865 |
| Ult. Elongation, % | 380 | 360 | 360 | 360 | 250 | 260 | 270 | 340 | 260 | 320 | 310 |
| Steel Ball Rebound - Compression Set Button - Cured 35' at 300°F | | | | | | | | | | | |
| %: at 73°F | 36 | 37 | 38 | 41 | 40 | 37 | 41 | 36 | 39 | 43 | 44 |
| %: at 212°F | 37 | 41 | 44 | 48 | 45 | 37 | 47 | 34 | 42 | 51 | 50 |
| Shore "A" Hardness - Compression Set Button - Cured 35" at 300°F | | | | | | | | | | | |
| at 73°F | 60 | 65 | 75 | 74 | 66 | 57 | 68 | 45 | 57 | 68 | 63 |

Overall, the properties for the low shear Baker-Perkins stocks were better than those of the high shear stocks.

In order to compare the dispersions of non-oil beaded carbon blacks and oil-beaded blacks processed in a Baker-Perkins mixer as well as the physical properties thereof, masterbatches were prepared and tested which gave the following results.

TABLE III

BAKER-PERKINS VS. PAINT MILL MIX OF VARIOUS CARBON BLACKS IN LIQUID RUBBER

| RECIPE NO. | 15A | 15B | 16A | 16B |
|---|---|---|---|---|
| Meth. of Carbon Black Disp. | PM | B-P | PM | B-P |
| ARCO CS-15 (Bd/St-OH term't) | 100 | 100 | 100 | 100 |
| Carbon Black, type | HAF | HAF | HAF | HAF |
| | (glycerin base) → | | (oil-beaded) → | |
| phr of black | 50 | 50 | 50 | 50 |
| phr of oil | — | — | 2.63 | 2.63 |
| Additional Dutrex 916 oil, phr | 15 | 15 | 12.37 | 12.37 |
| Hylene-T (TDI), phr | 6.48 | 6.48 | 6.48 | 6.48 |
| NCO/OH Ratio | 1.20 | 1.20 | 1.20 | 1.20 |
| Ethyl 702 Antioxidant | 1.0 | 1.0 | 1.0 | 1.0 |
| DBTDL | 0.05 | 0.05 | 0.05 | 0.05 |
| NPIRI RATINGS | 5/0 | 250/250 | 10/0 | 10/0 |
| Normal Stress-Strain Properties - Cured 40' at 300°F | | | | |
| 100% Modulus, psi | 260 | 110 | 325 | 278 |
| 300% Modulus, psi | 875 | — | 1150 | 975 |
| Tensile Strength, psi | 1800 | 110 | 1900 | 1825 |
| Ultimate Elongation, % | 550 | 130 | 500 | 500 |
| Aged Stress-Strain Properties - 4 days/212°F - Cured 40' at 300°F | | | | |
| 100% Modulus, psi | 450 | — | 550 | 500 |
| 200% Modulus, psi | 1125 | — | 1225 | 1025 |
| 300% Modulus, psi | 1825 | — | 1950 | 1500 |
| Tensile Strength, psi | 2100 | 200 | 1950 | 1750 |
| Retention, % | 116.7 | 186.1 | 102.6 | 95.9 |
| Ultimate Elongation, % | 340 | 70 | 300 | 370 |
| Retention, % | 61.8 | 53.8 | 60.0 | 74.0 |
| Hot Ring Tear at 212°F - Cured 40' at 300°F | | | | |
| Lbs./inch | 170 | 27 | 160 | 234 |

TABLE III-continued

BAKER-PERKINS VS. PAINT MILL MIX OF VARIOUS CARBON BLACKS IN LIQUID RUBBER

| RECIPE NO. | 15A | 15B | 16A | 16B |
|---|---|---|---|---|
| Shore "A" Hardness - Compression Set Button - Cured 40' at 300°F | | | | |
| at 73°F | 57 | 55 | 60 | 68 |
| Compression Set - ASTM (B) - 22 hours at 158°F - Cured 40' at 300°F | | | | |
| % | | 36.8 | 60.0 | 37.6 | 46.1 |
| Dispersion Rating | | 1 | *7 | 1 | 1 |

*The dispersion rating scale ranges from one through seven, with a rating of one giving the best dispersion and seven being the poorest dispersion, determined as described under Table I above.

As apparent from the above table, compound 15B which did not contain oil-beaded black but rather contained a conventional glycerin base carbon black, had a very poor dispersion rating. In contrast, compound 16B which contained an oil-beaded carbon black compound gave a very good dispersion rating when mixed in a low shear Baker-Perkins mixer. Additionally, the physical properties of the oil-beaded compound tend to be much better than the compound 15B which had poor dispersion.

It can thus be seen that the disclosed invention carries out the objects of the invention set forth above. While according to the Patent Statutes the best mode has been set forth, it will be apparent to those skilled in the art that many other modifications can be made without departure from the spirit of the invention herein disclosed and described, the scope of the invention being limited solely by the scope of the attached claims.

What is claimed is:

1. A low shear method of adequately dispersing carbon black in liquid elastomers comprising the steps of:
    adding to a container a liquid elastomer,
    an amount of from 5 to about 60 parts by weight of a hydrocarbon oil,
    adding to said container from 30 to about 160 parts by weight based on 100 parts of said liquid elastomer of an oil beaded carbon black containing from 25 to about 100 parts by weight of carbon black and containing said entire amount from 5 parts to about 60 parts by weight of said hydrocarbon oil so that said entire amount of hydrocarbon oil is added in the form of an oil beaded carbon black,
    mixing said compounds to produce a low viscosity, carbon black dispersed elastomeric composition,
    and mixing said compounds in a lower shear mixer.

2. A low shear method of adequately dispersing carbon black in liquid elastomers as in claim 1, including the additional step of curing said carbon black dispersed elastomeric composition.

3. A low shear method of adequately dispersing carbon black in liquid elastomers as in claim 1, wherein said oil ranges from 15 to about 40 parts by weight based on said liquid elastomer.

4. A low shear method of adequately dispersing carbon black in liquid elastomers as in claim 1, wherein said liquid elastomer has two or more terminally reactive groups and is selected from the class consisting of polybutadiene, polybutadienestyrene, polyisoprene, polychloroprene, coploymers of polybutadiene and acrylonitrile, polyoxytetramethylene glycol and polyoxypropylene glycol.

5. A low shear method of adequately dispersing carbon black in liquid elastomers as in claim 4, wherein said terminally reactive groups are selected from the class consisting of hydroxyl, mercapto and carboxyl end groups.

6. A low shear method of adequately dispersing carbon black in liquid elastomers as in claim 5, wherein said carbon black ranges from 40 to about 70 parts by weight.

7. A low shear method of adequately dispersing carbon black in liquid elastomers as in claim 5, including the additional step of preliminarily drying said oil-beaded carbon black before incorporating said oil-beaded carbon black into said liquid elastomer.

8. A low shear method of adequately dispersing carbon black in liquid elastomers as in claim 5, wherein said oil is an aromatic hydrocarbon oil.

9. A low shear method of adequately dispersing carbon black in liquid elastomers as in claim 5, wherein said terminally reactive liquid elastomers are cured with curing agents.

10. A low shear method of adequately dispersing carbon black in liquid elastomers as in claim 9, wherein said curing agents are compounds having the formula $R(N=C=X)_2$ where R is an aliphatic group having from 2 to about 20 carbon atoms, a cycloaliphatic group having from 4 to about 20 carbon atoms or an aromatic group having from 6 to about 20 carbon atoms, and X is oxygen or sulfur.

11. A low shear method of adequately dispersing carbon black in liquid elastomers as in claim 10, wherein said diisocyanate compounds are selected from the group consisting of toluene diisocyanate, 1,4-phenylene diisocyanate, bitoluene diisocyanate, hexamethylene diisocyanate, and dianisidine diisocyanate.

12. A low shear method of adequately dispersing carbon black in liquid elastomers as in claim 11 wherein said liquid elastomers are selected from the class consisting of polybutadiene, polybutadiene-styrene and copolymers of polybutadiene and acrylonitrile.

13. A low shear method of adequately dispersing carbon black in liquid elastomers as in claim 10, wherein from 0.01 to 1.0 percent by weight of a catalyst based on said liquid elastomer is added to increase the cure rate.

14. A low shear method of adequately dispersing carbon black in liquid elastomers as set forth in claim 12, wherein said carbon black ranges from about 40 to about 70 parts by weight.

15. A low shear method of adequately dispersing carbon black in liquid elastomers as in claim 12, wherein from 1.0 to about 3.0 equivalent amounts of R(N=C=X)$_2$ to said terminally reactive groups are added.

16. A low shear method of adequately dispersing carbon black in liquid elastomers according to claim 15, wherein said equivalent amount ranges from 1.0 to about 1.7.

17. A low shear method of adequately dispersing carbon black in liquid elastomers according to claim 10, wherein said oil is an aromatic oil.

18. A low shear method of adequately dispersing carbon black in liquid elastomers according to claim 15, wherein said oil is an aromatic oil.

19. A low shear method of adequately producing a cured elastomer article comprising the steps of:
adding to a low shear mixer a liquid elastomer selected from the group consisting of polybutadiene, a polybutadiene-styrene, polyisoprene, polychloroprene, copolymers of polybutadiene and acrylonitrile and polypropylene glycol, said liquid elastomers terminated by two or more hydroxyl groups, from 5 to about 60 parts of a hydrocarbon oil by weight, adding from 30 to 160 parts of an oil beaded carbon black containing from 25 to about 100 parts by weight of carbon black and containing said entire amount of said 5 to 60 parts of said hydrocarbon oil to said mixer so that said entire amount of hydrocarbon oil is added in the form of an oil beaded carbon black, mixing said compounds to disperse said carbon black, adding an equivalent excess based upon said hydroxyl groups of a diisocyanate curing agent having the formula R(N=C=X)$_2$ where R is an aliphatic group containing from 5 to about 20 carbon atoms or an aromatic group containing from 6 to about 20 carbon atoms and X is oxygen or sulfur, said amount being from about 1.0 to about 3.0 equivalent of said diisocyanate, mixing said diisocyanate curing compound in said dispersed carbon black-oil liquid elastomer, forming an article and curing to produce a cured solid elastomer article.

20. A low shear method of adequately dispersing carbon black in liquid elastomers comprising the steps of:
adding to a container a liquid elastomer,
adding to said container from 30 to about 125 parts by weight based on 100 parts of said liquid elastomer of an oil beaded carbon black containing from 25 to about 100 parts by weight of carbon black and containing from 5 to about 25 parts by weight of a hydrocarbon oil,
adding separately from 0 to about 35 parts by weight of a hydrocarbon oil,
mixing said compounds to produce a low viscosity, carbon black dispered elastomeric composition,
and mixing said compounds in a low shear mixer.

21. A low shear method of adequately dispersing carbon black in liquid elastomers as in claim 20, wherein said liquid elastomer has two or more terminally reactive groups and is selected from the class consisting of polybutadiene, polybutadienestyrene, polyisoprene, polychloroprene, copolymers of polybutadiene and acrylonitrile, polyoxytetramethylene glycol and polyoxypropylene glycol.

22. A low shear method of adequately dispersing carbon black in liquid elastomers as in claim 21, wherein said terminally reactive groups are selected from a class consisting of hydroxyl mercapto and carboxyl end groups.

23. A low shear method of adequately dispersing carbon black in liquid elastomers as in claim 22, wherein said carbon black ranges from 40 to about 70 parts by weight.

24. A low shear method of adequately dispersing carbon black in liquid elastomers as in claim 22, including the additional step of preliminarily drying said oil-beaded carbon black before incorporating it into said liquid elastomer.

25. A low shear method of adequately dispersing carbon black in liquid elastomers as in claim 24, wherein said oil-beaded carbon black is vacuum dried.

26. A low shear method of adequately dispersing carbon black in liquid elastomers as in claim 22, wherein said carbon black is a furnace grade carbon black.

27. A low shear method of adequately dispersing carbon black in liquid elastomers as in claim 22, wherein said oil is an aromatic hydrocarbon oil.

28. A low shear method of adequately dispersing carbon black in liquid elastomers as in claim 22, wherein said terminally reactive liquid elastomers are cured with curing agents.

29. A low shear method of adequately dispersing carbon black in liquid elastomers as in claim 28, wherein said curing agents are compounds having the formula R(N=C=X)$_2$ where R is an aliphatic group having from 2 to about 20 carbon atoms, a cycloaliphatic group having from 4 to about 20 carbon atoms or an aromatic group having from 60 to about 20 carbon atoms, and X is oxygen or sulfur.

30. A low shear method of adequately dispersing carbon black in liquid elastomers as in claim 29, wherein said compounds having the formula R(N=C=X)$_2$ are selected from the group consisting of toluene diisocyanate, 1,4-phenylene diisocyanate, bitoluene diisocyanate, hexamethylene diisocyanate, and dianisidine diisocyanate.

31. A low shear method of adequately dispersing carbon black in liquid elastomers as in claim 29, wherein said liquid elastomers are selected from the class consisting of polybutadiene, polybutadiene-styrene, and copolymers of polybutadiene and acrylonitrile.

32. A low shear method of adequately dispersing carbon black in liquid elastomers as in claim 29, wherein from 0.01 to 1.0 percent by weight of a catalyst based on said liquid elastomer is added to increase the cure rate.

33. A low shear method of adequately dispersing carbon black in liquid elastomers as set forth in claim 29, wherein an antioxidant is added to retard oxidation during cure and retard oxidation in the finished article.

34. A low shear method of adequately dispersing carbon black in liquid elastomers as set forth in claim 31, wherein said carbon black ranges from about 40 to about 70 parts by weight.

35. A low shear method of adequately dispersing carbon black in liquid elastomers as in claim 31, wherein from 1.0 to about 3.0 equivalent amounts of R(N=C=X)$_2$ to said terminally reactive groups are added.

36. A low shear method of adequately dispersing carbon black in liquid elastomers as set forth in claim 35, wherein said equivalent amount ranges from 1.0 to about 1.7.

37. A low shear method of adequately dispersing carbon black in liquid elastomers according to claim 29, wherein said oil is an aromatic oil.

38. A low shear method of adequately dispersing carbon black in liquid elastomers according to claim 35, wherein said oil is an aromatic oil.

39. A low shear method of adequately producing a cure elastomer article comprising the steps of:

adding to a low shear mixer a liquid elastomer selected from the group consiting of polybutadiene, polybutadiene-styrene, polyisoprene, polychloroprene, copolymers of polybutadiene and acrylonitrile or polypropylene glycol, said liquid elastomers terminated by 2 or more hydroxyl groups, adding from 30 to about 125 parts by weight based on 100 parts of said liquid elastomer of an oil beaded carbon black containing from 25 to about 100 parts by weight of carbon black and containing from 5 to about 25 parts by weight of a hydrocarbon oil, adding separately from 0 to about 35 parts of a hydrocarbon oil, mixing said compounds to disperse said carbon black, adding an equivalent excess based upon said hydroxyl groups of a diisocyanate curing agent having the formula $R(N=C=X)_2$ where R is an aliphatic group containing from 5 to about 20 carbon atoms or an aromatic group containing from 60 to about 20 carbon atoms and X is an oxygen or sulfur, said amount being from about 1.0 to about 3.0 equivalence of said diisocyanate, mixing said diisocyanate curing compound in said liquid elastomer, forming an article and curing to produce a cured solid elastomer article.

\* \* \* \* \*